United States Patent

[11] 3,575,586

| [72] | Inventor | Stanley A. Kroll<br>811 E. 22nd St., Brooklyn, N.Y. 11210 |
|---|---|---|
| [21] | Appl. No. | 677,816 |
| [22] | Filed | Sept. 7, 1967 |
| [45] | Patented | Apr. 20, 1971<br>Continuation-in-part of application Ser. No. 277,524, May 2, 1963, now abandoned. |

[54] AUTOMATIC AUDIT SYSTEM FOR PARKING GARAGES
24 Claims, 6 Drawing Figs.

[52] U.S. Cl. ................................................. 235/61.9, 340/51
[51] Int. Cl. ...................................................... G06k 15/00, G08g 1/00
[50] Field of Search.......................................... 340/51; 235/58 (P), 99.1, 61.9, 92 (36), 61.6, 61.7; 194/Parking Lots

[56] References Cited
UNITED STATES PATENTS

| 2,795,875 | 6/1957 | Nutter et al. .................. | 340/51X |
| 2,906,505 | 9/1959 | Orr et al. ..................... | 235/99X |
| 2,985,862 | 5/1961 | Drumm et al. ................ | 340/51 |
| 3,109,926 | 11/1963 | Bolton......................... | 235/92 |

Primary Examiner—Daryl W. Cook
Attorney—Leonard H. King

ABSTRACT: An apparatus for automatically recording car count and revenue data for an exit lane of a parking facility. The recorder prints a record of each tour of duty on the exit lanes, including information on the identification number of the employee, totals before and after the tour, all transactions not following the prescribed procedures, the time, and the data. The recorder can also print each individual transaction if desired. Preset amounts to simplify ticket validation are incorporated in the system.

INVENTOR.
STANLEY A. KROLL
BY
Leonard H. King
ATTORNEY

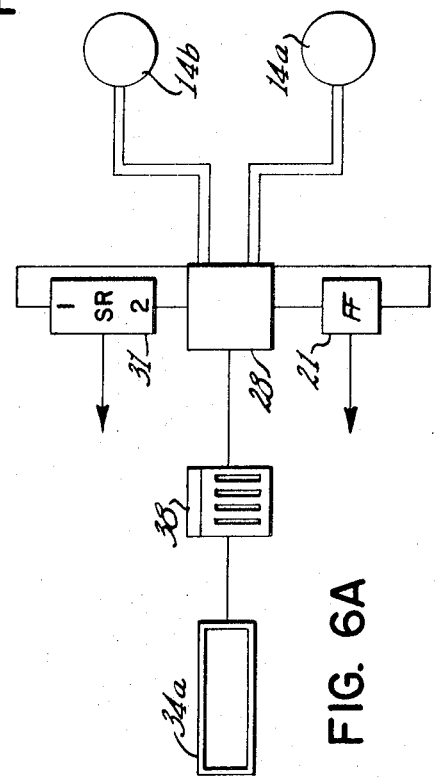

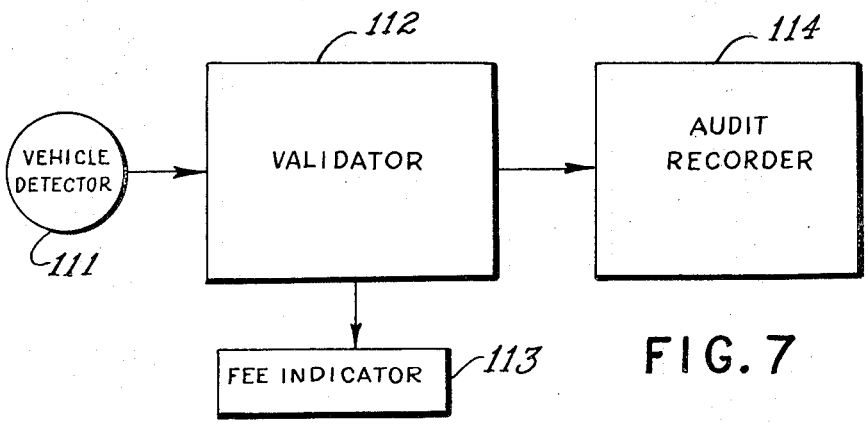
FIG. 7
FIG. 9
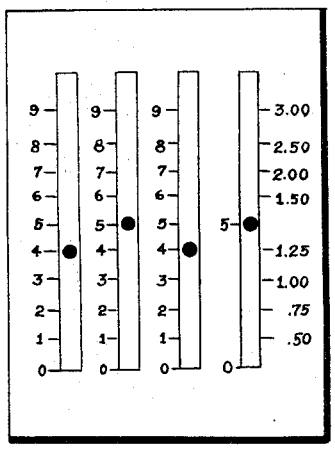
FIG. 10

AUTOMATIC AUDIT SYSTEM FOR PARKING GARAGES

The present application is a continuation-in-part of my copending application Ser. No. 277,524.

This invention relates to a vehicle parking facility and particularly to an automatic car revenue control for cars exiting from the facility.

BACKGROUND OF THE INVENTION

The system comprises various control means which, in combination, require a predetermined sequence of events to occur during entry, parking, and exit of each vehicle. Any deviation from the prescribed sequence will result in an alarm being sounded indicating and recording the location and type of such occurrence. Thus, such improper use of the facility, by either the patron or operating personnel, whether it be accidental or intentional, is discouraged. The system further provides for both qualitative and quantitative record keeping. A cumulative record of each entering and exiting vehicle, as well as cash receipts, is made by counters associated with each lane. In addition, for purposes of control, and for improvement in operating techniques, a record is made of improper facility use both as to type and location. As the description of the entry and exit sequential procedures is disclosed in greater detail, the applicable control and recording means will be interposed to illustrate the cooperative relationship of components in the integrated system.

In the above-mentioned copending application, an entire system of control was described for a parking facility. The system includes a method for monitoring both incoming and exiting cars, a location control, and traffic volume coordinator. By means of audible alarm signals and printed alarm records misuse of the facility by either a patron or operating personnel is discouraged. Records for the facility are kept on a cumulative printed sheet wherein a single record was used for all lanes, both incoming and exiting. The cumulative record printed totals of cars coming in and out and total funds collected for each exit lane. At each improper use of the facility, the cumulative record printed both the time of occurrence of such improper use, as well as the totals for the lane in which the improper use occurred. As new employees begin their tour of duty, the cumulative record also printed the totals for the particular lane being put to use.

The instant application discloses a more versatile and simpler recording unit associated with the exiting-money collecting lanes. As will hereinafter be described, each exit lane will have associated therewith a separate, individual record of cars and financial collections. At various points during a tour of duty, the individual record will not only print totals, but separate transactions. For each tour of duty the recorder will reset so that records can be kept for the transactions of each employee. The identification number of each employee will appear on the record thus simplifying auditing. By presetting the validator with the most usual occurring transaction amounts, the employees will be able to simplify validation of each parking ticket with more speed and simpler procedures. The instant application includes an improvement of the validation and auditing procedures of the entire system of the aforementioned copending application, and as such presents unique features not disclosed in the aforementioned application.

It is therefore an object of the invention to provide a sequentially controlled means of entrance, parking, and exit of vehicles in a parking garage or area.

It is a further object of the invention to enforce proper registration of monies collected.

Another object is to provide a count of vehicles entering and vehicles exiting, together with cumulative totals of revenues collected.

It is a further object of the invention to sound an alarm, or to give visual means of such alarm, and to print a record of said alarm whenever the prescribed procedures are not followed.

A further object of the invention is to furnish a printed cumulative count of all vehicles entering and all vehicles exiting the facility.

Another object is to furnish a printed cumulative count of all parking tickets validated in each exit lane of the facility.

Another object is to provide a system employing a vehicle detection means which makes it impossible to validate a ticket in the prescribed manner unless vehicle is in the field of the detecting device.

It is a further object of the invention to cause a print or record to be made in the case of any ticket validated after the vehicle has departed from the field of detection.

Another object is to furnish a printed record of certain events taking place in the facility which are not in accordance with prescribed procedures.

It is a further object to identify in the printed record the particular lane in which the nonprescribed action took place.

An additional object is to sound an alarm or to indicate an alarm by visual means each time certain nonprescribed events take place.

Another object is to provide a vehicle detection means and cooperating circuitry which will cause a printed record to be made when any vehicle enters an exit lane or exits from an entrance lane.

Another object is to provide means electrically interlocked with a vehicle detection means to print the amount paid, the departing time and date, and the cashier's code number on each ticket validated while a vehicle is in the presence of the detection means.

Another object is to visually display in the driver's field of view the dollar amount validated.

It is a further object, on request of the driver, to furnish a printed receipt of the dollar amount validated.

It is an added object to provide circuitry which makes it possible to use certain lanes as either entrance or exit lanes dependent upon the traffic flow.

It is an object of this invention to provide an improved means of auditing the cars and revenues of an automatic parking facility.

Another object is to provide a count of vehicles and revenues for each exit lane of a parking facility.

A further object is to provide a full audit system for each tour of duty of every employee on an exit lane.

Still another object is to record certain events taking place in the exit lane which are not in accordance with prescribed procedures.

Another object is to provide an individual printed record of each transaction for each exit lane while still accumulating the totals for that lane.

An additional object is to provide an audit record of each tour of duty wherein the record contains the identification symbol of the employee.

A further object is to provide a validator which is preset for certain commonly occurring values whereby validation occurs by pressing of a single preset key.

It is a further object to provide a printed receipt of the transaction upon the request of the driver.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

DESCRIPTION OF THE DRAWING

FIG. 4 is a fragmentary view of a recorder-computer master record sheet.

FIG. 5 shows a typical parking ticket after validation.

FIG. 6A illustrates a reversible lane normally arranged for entrance, but which may be used as an exit.

FIG. 7 is a simplified block diagram of the major components of the system.

FIG. 9 is a fragmentary view of an audit recorder tape.

FIG. 10 is a front view of the validator keyboard.

ENTRY PROCEDURE

Figure 1:
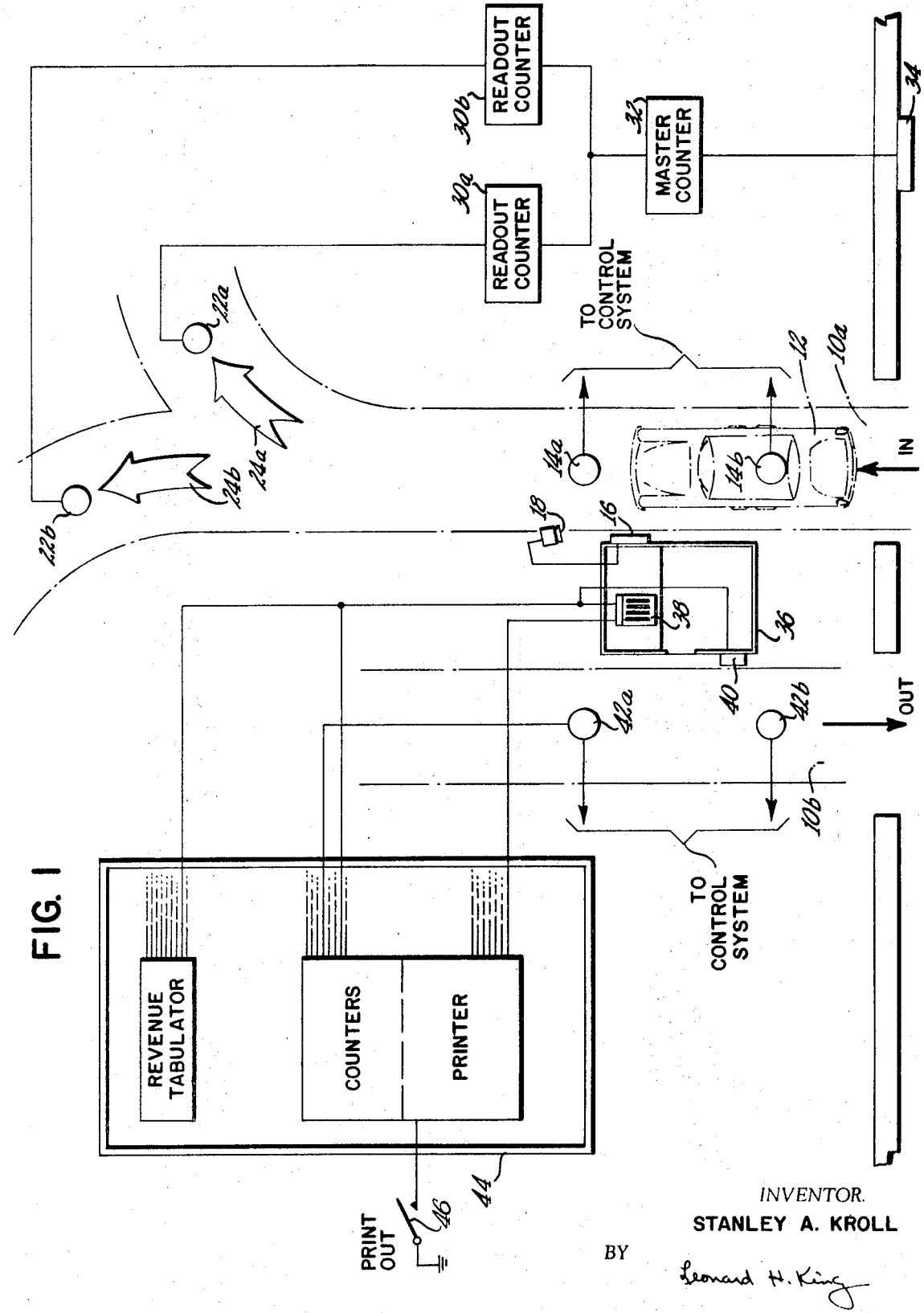
FIG. 1 is a schematic plan view of a parking facility arranged in accordance with the present invention. For purposes of simplification, only two typical lanes, one entry and one exit, are illustrated.

In FIG. 1, lanes 10a, 10b, etc., are arranged so that an entering vehicle 12 comes within the field of influence of detecting apparatus 14a and 14b as it approaches the ticket dispensing machine 16 located at one side of the lane. Immediately beyond, and in full view of the driver, is a barrier such as a signal light or gate 18. An amber light is presently preferred as the signal light. The detecting apparatus consists of single or dual vehicle presence detectors mounted, for example, above or below the entry path of the vehicle. Currently ultrasonic detection devices are preferred. However, infrared, photoelectric, sensing switch and other suitable types may be employed. In the embodiment illustrated, dual detectors are shown. The ticket dispensing machine 16 is energized by detectors 14a and 14b causing it to issue a single, time-stamped ticket only when the vehicle is stopped beneath the detecting apparatus. Upon removal of the ticket by the driver or attendant stationed there, the amber light changes to green or the gate barrier rises to permit passage of the vehicle. Upon passing the field of influence of the detecting apparatus, the ticket dispensing machine is deenergized and the barrier gate is lowered after a short time delay. To expedite entering traffic, the gate will not lower if a close-following vehicle takes a ticket from the ticket dispensing machine as the leading vehicle passes from the detectors' influence.

An important feature of the invention is the alarm system which guards against entering the facility in any manner except that prescribed, or exiting from an entrance lane where the gate barrier is not used. The alarm may consist of both an audible device, such as a bell or buzzer, and a visible signal, such as a flashing light, and in addition, a printed entry hereinafter termed an "alarm print," listing detailed information on the recorder-computer located in the administration office or in a separate, conveniently accessible cabinet. The alarm will sound and an alarm print will be made each time any of the following events takes place: a vehicle leaves via an entrance lane; a vehicle drives into an entrance lane, takes a ticket and backs out of the lane; if a vehicle attempts to drive past the amber light adjacent to the ticket dispensing machine without taking a ticket (this case in a lane where the gate barrier is not used). When the vehicle enters in the prescribed manner, no alarm will sound, nor will an alarm print be caused at the recorder-computer.

A recorder-computer or printing device (to be described hereinafter in greater detail) is located in a cabinet or container convenient for observation. The recorder-computer maintains, by lanes, cumulative totals of the quantity of tickets issued, quantity of tickets validated and other statistical information. All alarms are automatically printed at their time of occurrence. The recorder-computer can be made to print automatically once each hour or a print can be taken at any time on demand. The operation of the entire facility can be determined at a glance by observing the information supplied by the recorder-computer. It is tamperproof and it is current.

TRAFFIC VOLUME AND LOCATION CONTROL

Additional detectors 22a and 22b, as well as directional signals 24a and 24b, automatically count and direct vehicles to appropriate locations within the garage. The detectors are connected to counters which indicate only the total unoccupied spaces by given area, such as main floor, lower level, upper level, etc. When a car leaves an area, the applicable counter reflects the change. When a preselected percentage capacity has been reached, traffic is directed to other areas in the facility. Information from the individual area space-available counters is supplied to a master counter which shows the total space available in the entire parking garage. When total occupancy has reached a preset amount, FULL signs 34 are illuminated at the entrances. As vehicles leave the facility, the counters indicate sufficient space is available to reach an occupancy level below that which caused the FULL signs to illuminate, whereupon they will extinguish.

EXIT PROCEDURE

Each exit lane booth 36 is in charge of a cashier who is provided with an individually cut or coded key with which validating device 38 and fee indicator 40 are activated. Prior to insertion of the cashier's key into the validating device, the cashier's identification number and the lane number must be set on the validating device. When the key is inserted, the fee indicator illuminates and a "start" print is made at the recorder-computer which shows the total existing on the counter at that time (see time 1601, FIG. 4). The presence of a vehicle in the field of influence of detectors 42a and 42b, adjacent to cashier's booth 36, completes the circuitry for operation of the ticket validating device. When the outgoing driver presents a ticket, the cashier checks the entry and exit times, computes the charge, and sets the validating device to the proper amount. The insertion of the ticket in the validating device automatically causes imprinting thereon of time out, amount paid, cashier's identification number, and lane number. At the same time, the fee indicator displays the amount to be paid. To prevent tampering, the validating device is made so that it can validate only one ticket at a time and that only when a vehicle is within the field of influence of the detector. Further, the keys of the validating device are locked by a latching solenoid at the amount displayed and/or stamped on the ticket until the vehicle leaves the detector field. The fee indicator displays this amount until the vehicle leaves the detector field whereupon the validating device unlocks and the amount shown on the fee indicator extinguishes. If desired, the displayed amount can be retained and extinguished by a signal generated by the approach of a succeeding vehicle or by closing of the lane.

If a driver attempts to pass the cashier's booth without stopping, the alarm will sound and an alarm print will be made at the recorder-computer. If the driver hands the ticket and the correct amount to the cashier, then drives off before the ticket can be validated, the alarm will sound and an alarm print will also be made at the recorder-computer. In order to validate such a transaction, the cashier is required to depress an enabling lever or emergency switch which also causes an alarm print to be made. An alarm will also sound and an alarm print will be made if a vehicle attempts to exit from an entrance lane where a barrier gate is not used.

There are several additional functions which may be carried out together with the basic validation of the ticket. A receipt may be issued on call at any time after the amount has been set into the validating device as long as the vehicle has not left the field of the detector. The mere pressing of a button ejects the receipt. A saving in operating cost results from the arrangement whereby a receipt may be printed only when the customer requests it. Charge account transactions may be also accommodated by issuing credit cards adapted for use with the ticket validating device. A conventional card printer located close to the validating device can be used to transfer the customer's name and account number, as embossed on the credit card, onto the ticket. These credit card printers can be supplied with an edge cutting device so that the charge tickets can quickly be identified for easy separation from the regular tickets. The validating device is also adaptable for use in cooperation with local merchants who give parking stamps with purchases which are redeemable for cash credit. The actual amount paid would be displayed on the fee indicator. In a typical program, the cashier inspects the ticket to note the amounts of the stamps affixed to the back of the ticket by participating merchants. The auditor can determine why the fee paid differed from the amount which would have normally been paid, on the basis of parking time, had there been no stamp credit.

To accommodate the direction of traffic flow one or more lanes can be designed for reversible operation. Such a lane is normally arranged as an entrance. FIG. 6A shows only the basic changes in circuitry necessary to set up a reversible lane. Detectors 14a and 14b, sequential relay 31, and flip-flop 21 are connected through a multicontact reversing switch 28 which is actuated by insertion of the cashier's key into the validating device 38; this changes the lane from an unattended entrance lane to an exit lane. Upon insertion of the cashier's key, the ticket dispensing machine 16 is made inoperative and the entrance barrier or traffic light 18 is extinguished. At the same time, a sign 34A at the entrance of the lane is illuminated to read DO NOT ENTER.

A cashier closes a lane to traffic merely be removing his individual key from the validating device. This causes a print to be made at the recorder-computer which shows the totals accumulated during the duty tour of the cashier and deenergizes the validating device and fee indicator but leaves the detector operative. The passage of a vehicle through such an unattended lane will sound the alarm and an alarm print will be made at the recorder-computer. Thus, attention is drawn and a record is made of any unauthorized vehicle passing through a closed lane in either direction.

Figure 3:
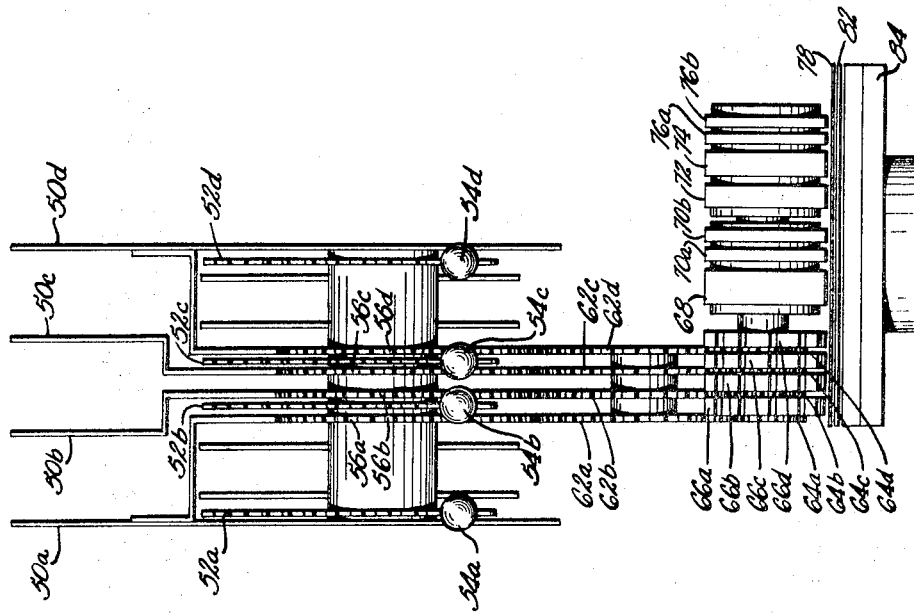
FIG. 3 is a fragmentary front elevational view of a portion of the validating mechanism.
Figure 2:
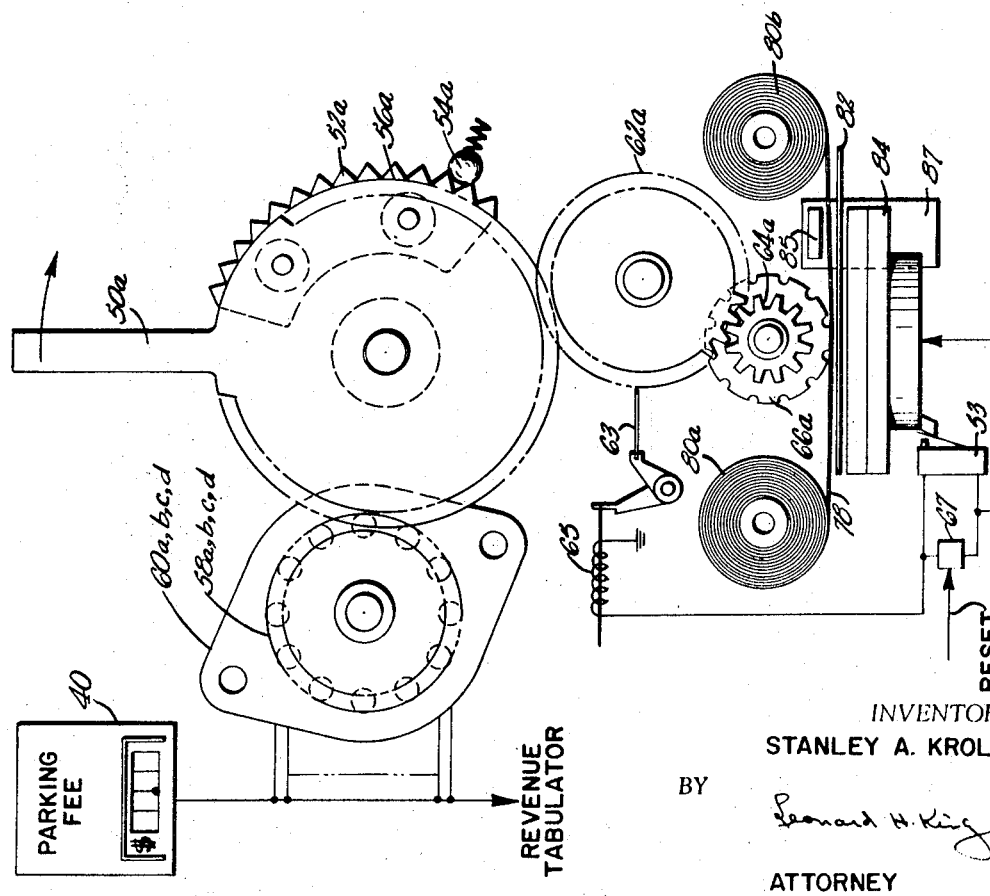
FIG. 2 is a fragmentary side elevational view of a portion of the validating mechanism.

FIGS. 2 and 3 illustrate the value setting and printing mechanism of the validating device. $50a, 50b, 50c, and 50d protrude through slots in the validating device housing and are movable by the cashier to various combinations of settings to indicate the parking fee. Secured to the handles 50 are detent sectors 52a, 52b, 52c and 52d, which, in cooperation with spring loaded balls 54a, 54b, 54c and 54d, provide a series of positive stops or locations for each handle corresponding to currency denominations marked on the housing. For instance, proximate the slot for handle 50a is the marking $ and also the numerals 9, 8, 7, 6, 5, 4, 3, 2, 1 and 0. Adjacent the slot for handle 50d are only the numerals 5 and 0. Therefore, the validating device can print from $00.05 to $99.95.

Formed integrally on the handles are gears 56a through 56d which mesh with gears 58a through 58d. Each gear carries a wiper arm which will selectively position contacts of wafer switches 60a through 60d. Thus the handle settings for each transaction are converted into electrical signals used to illuminate the transaction cash amount on the fee indicator 40. These signals can also be routed to an indicating device at a location accessible only to management or they may be utilized to print on a paper tape to form a tamperproof record for management use.

Also in mesh with gears 56a through 56d, are idler gears 62a through 62d, which in turn drive spur gears 64a through 64d. Idler gears 62a through 62d have associated therewith a latching mechanism 63 actuated by a solenoid 65 to prevent a resetting of the validating device after the parking fee has been recorded or displayed on fee indicator 40. When the cashier operates the validating device, the holding coil 67 keeps solenoid 65 energized until a reset signal is received from detector 42b upon the vehicle leaving the field of its influence. Each gear 64a through 64d is secured to freely rotating print wheels 66a through 66d, which have legends embossed thereon corresponding to the legends adjacent each handle slot. Mounted on the same shaft as print wheels 66a through 66d are additional freely rotatable print wheels 68, 70a, 70b, 72, 74, 76a and 76b, which indicate, respectively, in legend and digits, the month, day, A.M. or P.M., hour and minute. These wheels are driven from conventional and well known timer means. Directly below the print wheels is passed an inked printing ribbon 78 which runs between spools 80a and 80b. Parking ticket 82 is interposed between the ribbon 78 and print hammer 84 for transferring the information from the handle settings to the face of the ticket. Cashier's coded identification key 85 is also positioned above the ticket proximate switch 87. When the key is inserted into the validating device a distinctive legend assignable to only one cashier is printed at the same time. This provides means for checking the accuracy and efficiency of the cashier.

An emergency switch 57a is provided at the validating device to permit fingertip control of validation where an equipment failure has made such action necessary in order not to slow traffic. Each time the emergency switch is pressed, a print of the counters of the applicable lane is made at the recorder-computer so that management can be alerted to the condition and take the needed steps to remedy it.

RECORDER-COMPUTER

The recorder-computer 44 (FIG. 1) is used to print a tamperproof record of various combinations of statistical performance information. An important feature of the invention is that the recorder-computer may be located at a remote location accessible only to management. A fragmentary view of a typical printed record 86 is shown in FIG. 4. All vehicle entries and exits are counted lane by lane. Every insertion and removal of a cashier's coded key at the validating device causes a print to be made of the totals of the reading of the vehicle cumulative counters for the associated lane together with the date and time of day. The difference between such entries represents the number of vehicles that have passed through the lane between the times indicated; this quantity can be reconciled with the quantity of tickets collected or dispensed at a particular lane over the same time period. At any time desired a print for all lanes may be made by pressing lever 46; this action can also be made automatic at selected time intervals.

Revenue totalizing counters are provided for each exit lane. These units accumulate the amounts in dollars and cents recorded for each transaction of the validating device. The difference between the printed totals at the start and completion of a cashier's tour of duty will equal the sum of all the cash amounts printed on the tickets. As a further control, it is possible to set the recorder-computer 44 to print a detailed record of each validation of any specific exit lane. The record then would consist of the cumulative totals for the particular lane and each successive reading will differ by the amount of the validated transaction. The recorder-computer employs conventional print wheels which are advanced by pawls whenever an associated solenoid is pulsed. Printout is obtained by a print hammer associated with each set of wheels. If desired, once an hour, or at any selected time interval, all solenoids connected to print hammers are energized to actuate all the hammers. At other times, only the hammer solenoids associated with a given lane are energized. The recorders are standard, commercially available items.

FIG. 4 illustrates a fragment of a typical recorder-computer record sheet 86 printed at a location accessible only to management. The record reads in an upward direction from the bottom. The right-hand two columns show date and time, the first three pairs of columns on the left list quantities of vehicles in and out of entrance lanes 1, 2 and 3. The triple columns for lanes 4 and 5 list tickets validated, quantity of cars exiting and amounts collected. The first entry at the bottom of the sheet is an example of the complete printing taken automatically on the hour of 1600. The entry at 1601 is a cashier start print for lane 4. The next entry (reading up the sheet) is an alarm print which shows that one vehicle exited through entrance lane 1 at 1635. The entry at 1651 is an alarm print which shows that one vehicle exited from exit lane 5 before ticket validation was made. The next entry of 1652 shows that the ticket was validated in the amount of $2.50 by the actuation of the emergency lever on the validating device by cashier in lane 4. The succeeding entry at 1700 illustrates another automatic complete print at a 1-hour interval after the similar action at 1600. At 1732 a vehicle exited from entrance lane 3. The uppermost entry is an illustration of a demand print made when management wished to check the operation of the facility. The entries for lane 5 remain static and show that this lane was not open to traffic during the time covered by the example. Entrance lane 1 showed a total of 102 vehicles entering the facility while lanes 2 and 3 show only 3 and 1 vehicles entering, respectively. A check of activity in lane 4 shows that the validation total 00488-00335 equals the total quantity of vehicles outbound which is 75274-75121, both being 153. The money amount for the period of activity shown is $0622.50 less $0325.00 or $297.50 which will be the total of the amounts of the 153 tickets which have been validated in lane 4 during the period shown on the illustration.

The manner in which the recorder-computer accomplishes its functions is as follows:

Standard solenoid-actuated printing counters are pulsed by vehicle detecting devices. There is a counter for each direction for each entrance lane. For each exit lane, there is a counter which shows the total quantity of validations. Counters are also provided for printing the date and time in hours and minutes. Solenoid-actuated print hammers are associated with each counter.

Automatically, at selected time intervals, or manually, when the manual print button 46 is pressed, all the print solenoids are energized and a complete printed line of all data is recorded. When a cashier starts a tour of duty and inserts the key in the validating device, the cumulative total quantities of tickets validated and of vehicles exited, together with the day's cumulative total amount of money registered by the validating device only for the lane concerned, are printed together with the date and time. A similar type of print is made when the cashier's key is removed from the validating device.

As hereinbefore explained, when a vehicle enters or exits from the facility in any but the prescribed manner an alarm is sounded or given visually and an alarm print is made by the recorder-computer. Because of their importance, these features connected with the exit lanes and the control of the collection of monies are restated hereinbelow:

If a vehicle leaves through an exit lane before the cashier validates the ticket an alarm sounds and an alarm print is made. In order to validate the ticket with no vehicle in the field of detection, the cashier is required to press an emergency enabling lever or switch; this unlocks the validating device and also causes an alarm and the making of an alarm print. Since both ticket and printed recorder-computer record show the time, the particular ticket can readily be found by the auditor to check whether the correct money amount was post-validated when the enabling lever was pressed. Since the cashier knows that a tamperproof record is being maintained, pilfering is discouraged. If too many alarm prints are being made for any particular cashier, the recorder-computer can be set to print every validation action for close surveillance of the cashier.

FIG. 5 shows the face of a validated parking ticket 82, stamped to show date, time of entry and exit and parking fee. The cashier's identifying number is also indicated. On the side of the card is an area reserved for credit card stamping. The merchant's stamps hereinbefore referred to may be conveniently affixed to the reverse side of the parking ticket.

Figure 6:
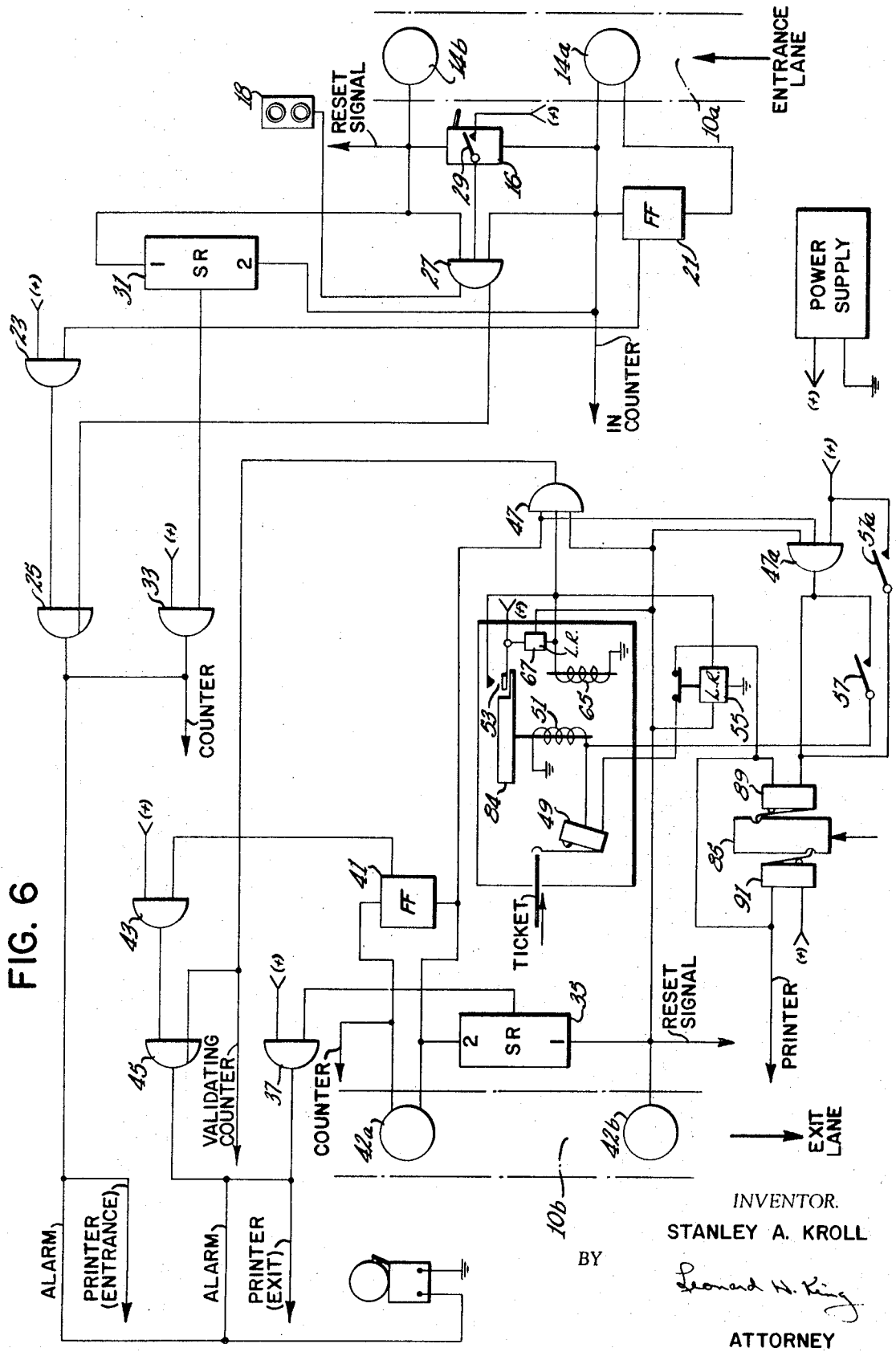
FIG. 6 is a logic circuit diagram of the system.

The system disclosed in FIG. 6 can be instrumented by any of the conventional approaches available to the art. It may employ solid state devices, such as transistors, or electromechanical devices, such as relays. Such devices are now well known in the art. Accordingly, for simplicity and clarity of exposition, the operating circuit is disclosed herein in terms of logic blocks. Thus a flip-flop may be composed of two transistors, one of which is turned off generating one voltage level, and the other switched on generating the second voltage level. It may be a thyratron with one output terminal, its two states being fired and not fired; it may be a square hysteresis-loop magnetic core magnetized to a state of either positive or negative remanence or, it may be a simple, electromechanical holding-coil relay. The logic blocks will retain an applied signal until a reset signal is received.

As the vehicle 12 enters the garage and comes within the sphere of influence of detector 14a, a signal is transmitted to flip-flop circuit 21 which is in its inhibit state. If the vehicle does not stop to take a ticket, sensor 14a generates an off-pulse which is received by flip-flop 21 placing it in its enable state. This causes AND gate 23 to conduct, thus sounding the alarm and causing the recorder-computer to print information related to that lane. This assumes that no inhibit-signal is present at OR gate 25. If the vehicle stops in the sphere of influence of both detectors 14a and 14b, then signals are applied to AND gate 27, which, it will be noted, has three inputs, one of which comes from ticket dispensing machine 16. Upon removal of the ticket from the machine, switch 29 is closed providing a signal which is transmitted to AND gate 27 thus inhibiting gate 25, forestalling operation of the alarm and recorder-computer.

In the event that a vehicle attempts to leave the facility through an entrance lane, and thereby avoid the cashier, the vehicle will come within the influence of detector 14b, and then sequentially, detector 14a. When this occurs, sequential relay 31 is activated in the alarm and 1-2 order shown within its box causing AND gate 33 to actuate the alarm and the recorder-computer. A similar arrangement is provided on the exit lane so that a vehicle entering the facility from an exit lane will activate sequential relay 35 causing AND gate 37 to apply power to the alarm and applicable printing counters of the recorder-computer. Vehicles traversing a lane in the prescribed manner will not cause an output from the applicable sequential relay, thus forestalling operation of the alarm and the making of an alarm print at the recorder-computer. A single alarm bell or flashing light can be used in common for all lanes, the print on the recorder-computer alarm print showing which lane is affected.

It is desired to make certain that a vehicle stops at the cashier's window and that the cashier at that time validates the ticket, the fee indicator displaying the amount charged and registered. Accordingly, the circuits are so arranged that as the vehicle approaches, detector 42a provides a pulse to flip-flop 41 which is in an inhibit state. As the vehicle leaves the field of influence of detector 42a, a second pulse is applied to flip-flop 41 placing it in an enable state causing AND gate 43 to apply a signal to OR gate 45. If OR gate 45 is in an enable state, it will actuate the alarm and cause an alarm print to be made at the recorder-computer. The state of OR gate 45 is determined by the output of AND gate 47 which requires three inputs, viz., one from detector 42a, one from detector 42b (thus assuring that the vehicle is stopped in front of the cashier's window) and a third from the validating device. As the cashier inserts the ticket into the validating device, switch 49 is closed, completing the circuit to ground through solenoid 51 causing printing hammer 84 to strike the ticket. As hammer 84 imprints the ticket, switch 53 closes, energizing the third input of AND gate 47. Thus, all conditions having been met, namely, the vehicle stopped in front of the cashier's window in the sphere of influence of detectors 42a and 42b, and the ticket being validated, gate 45 is in an inhibit state, forestalling the giving of an alarm or the making of an alarm print at the recorder-computer. Unless AND gate 47a receives signals from detectors 42a and 42b, the validating device solenoid 51 will not be energized from the power source. An out-of-sequence energization of detectors 42a and 42b will cause an alarm to be given as with detectors 14a and 14b. Switch 53 also applies a signal to latching relay or gate 55 which then cuts off further application of power to solenoid 51 until the vehicle leaves the field of influence of detector 42b, at which time a reset signal clears the validating device making it ready to validate a succeeding ticket. If a driver requests a receipt, this may be given by pressing bypass button switch 57 which reenergizes solenoid 51.

It is desired that the cashier receiving the money be identifiable from the validated ticket. Accordingly, the insertion of key 85 bearing the cashier's identification in raised print type is required in order to close switch 89 to complete the circuit to solenoid 51. As the key is inserted, switch 91 is actuated to complete a circuit to energize the recorder-computer to provide a printout of the lane count at the time the cashier went on duty and at the time the cashier left duty, as signified by the withdrawal of the key.

The closing of switch 53 also provides a signal to a counter which prints on the recorder-computer sheet 86 the total number of tickets validated in that lane. This may readily be compared with the count of total vehicles for that lane, thus providing a close check on the cashier. If this record is not made, then it is possible for the cashier to conceal a portion of the validated tickets together with the corresponding amount of cash.

The preferred embodiment exiting system as is herein contemplated is shown in FIG. 7 to contain a vehicle detector 111, a validator 112, a fee indicator 113, and an audit recorder 114. As a car exits, the vehicle detector energizes appropriate circuits. The employee sets the appropriate keys on the validator keyboard corresponding to the fee to be paid. The ticket is then inserted in the validator closing a switch which energizes the printing mechanism, the corresponding digit coils in the audit recorder and the fee indicator. Therefore, whatever number is set on the keyboard will be printed on the ticket, transmitted to the audit recorder and displayed on the fee indicator. The fee indicator is located in view of the driver so the amount to be paid can be seen. The audit recorder is set in a controlled area, e.g., the manager's office, and prints the entire record of the exit lane. Each exit lane has its own audit recorder.

The audit system for the exit lane is designed for specific procedures to carry out the following instructions: (1) opening the lane, (2) closing the lane, (3) normal validation, (4) receipt, (5) alarm circuit, (6) emergency print, and (7) preset key control. Each of these procedures will be described with respect to FIG. 8.

OPENING THE LANE

Each employee has a key with an identification number embossed on it. The key is inserted into the validator to open the lane and it is removed when the lane is closed. The identification number of the employee will be imprinted on each parking ticket and receipt, as was described in the copending application.

Figure 8:
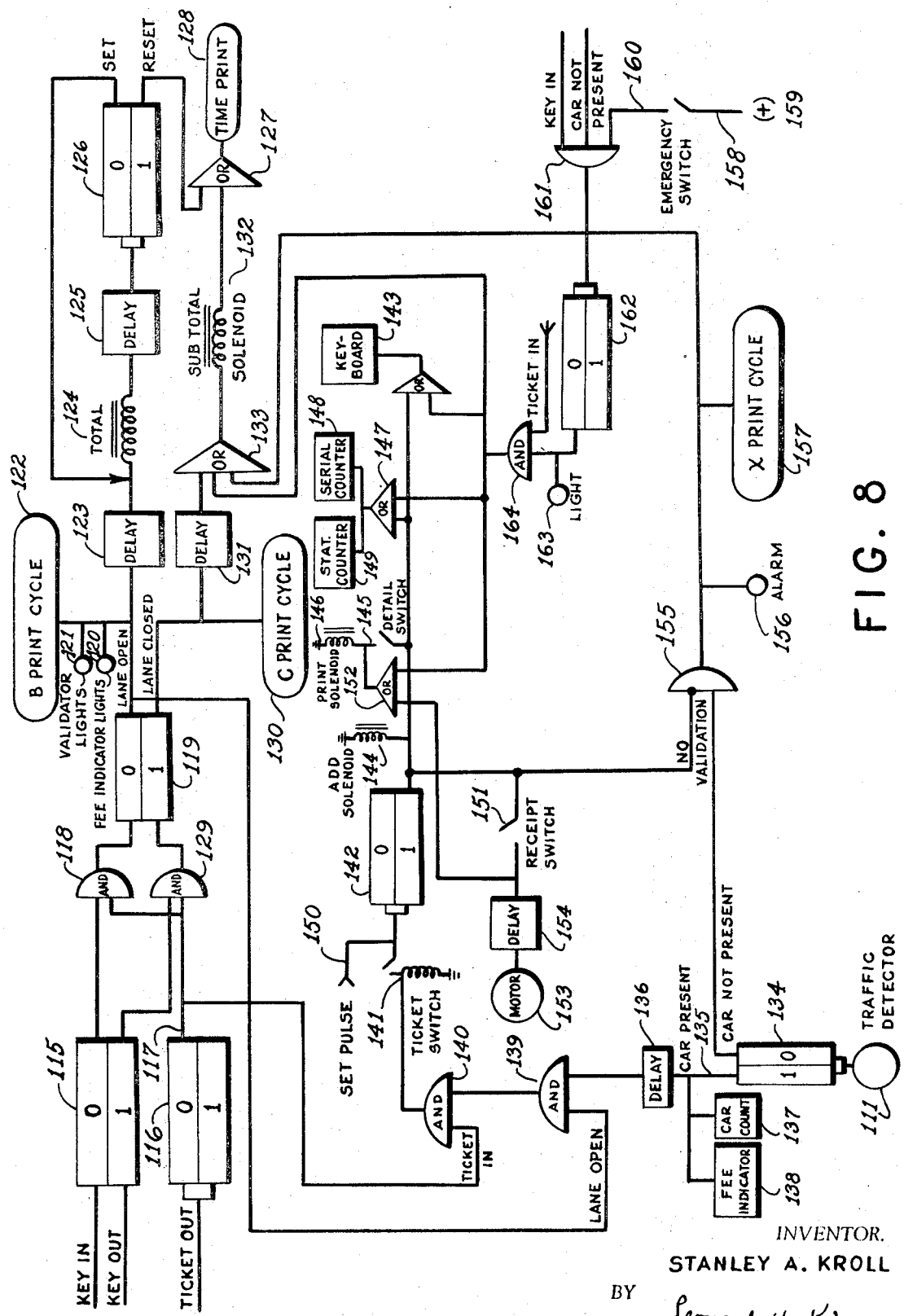
FIG. 8 is a simplified logic circuit showing the operation of the system.

With reference to FIG. 8, when the key is inserted, the "key in" output of flip-flop 115 will be true. When a ticket is inserted, it will set trigger 116 and an output will appear on line 117. Consequently AND gate 118 will be open and will set flip-flop 119. As a result, the LANE OPEN will be true.

When the lane open signal is true the lights on the validator 120 and the fee indicator 121 will be turned on. The lane open signal initiates a "B Print Cycle" 122. This cycle consists of a printing cycle on the audit recorder. The B coil is energized, the "red print" is energized, the keyboard is energized and the fee indicator is cleared. This cycle causes the letter B to be printed in red on the audit recorder followed by whatever keys are energized on the validator keyboard which are also printed in red.

The instant system contemplates that at the beginning of a tour of duty, when a lane is opened, the ticket inserted would be the tour of duty card. The employee would set the validator keys to his identification number. This identification number will then be printed in red by the audit recorder so that the tape would indicate the beginning of a tour and the employee on duty.

After the "B print signal" there is a delay 123 to be sure the machines have completed the printing. The "total" solenoid 124 is energized. The audit recorder will print in black the total figures combined in the accumulator. This will be the total number of cars and the total fees collected during the last tour of duty. The accumulator is so arranged that after a "total" print, the accumulator is cleared. (The accumulator is not cleared after a "subtotal" print). Following the printing of the totals, there is a delay 125, to be sure the accumulator has been cleared and then trigger 126 is fired. The trigger 126 will be "set" and the output signal will again energize the "total" solenoid 124. This time the audit recorder will print nothing since the accumulator has been cleared. This second "total" print is a check to be sure the accumulators are cleared at the beginning of a tour of duty. After the delay 125, the trigger 126 is again tried, this time the "reset" output is true. This last output from trigger 126 will pass through OR gate 127 to initiate the "time print" 129. This cycle, after a delay to permit completion of any previous cycle will print the time in red on the audit recorder tape. The cycle also resets the fee indicator. During the time printing a hold circuit (not shown) is energized which prevents the time clock from advancing while the time is being printed.

Although not shown for simplification purposes, additional circuitry can be included in the lane opening procedures whereby the LANE OPEN output will be inhibited if the keyboard keys are not set properly or if there has been an alarm condition, as will be hereinafter described.

CLOSING THE LANE

At the completion of a tour of duty, the cashier's key is removed and the tour card is validated with the day and month set on the keyboard; whereupon, the exit lane is then closed.

Referring to FIG. 8, when the key is removed, the "key out" signal of flip-flop 115 is true. When the tour of duty ticket is then inserted, the output from trigger 116 will appear on line 117. Gate 129 will be opened and the LANE CLOSED output of flip-flop 119 will be true. The "lane closed" signal will initiate a "C print cycle" 130 on the audit recorder. This cycle will energize the C coil, the "red print," the keyboard, and will reset the fee indicator. The audit recorder tape will therefore print in red the letter C with the day and month as was set on the validator keys.

After a delay 131 to allow for the completion of the printing cycle the subtotal solenoid 132 will be energized through OR gate 133. This will print the subtotals at the completion of the tour of duty on the audit recorder tape. Then through gate 127 the time print cycle 128 will cause the time to be printed in red onto the tape.

NORMAL VALIDATION

When a vehicle arrives at the cashier's booth it is sensed by a traffic detector 111 which transmits a signal to the input of the trigger 134 causing the "car present" signal to be true. The output appears on line 135.

The signal passes delay 136. This delay is necessary in order to allow for the completion of the last cycle in the audit recorder, in the event that the arrival of the car has been preceded by any type of operation of the system or an alarm condition (to be explained hereinafter).

The "car present" signal energizes the car count 01 solenoid 137 in the audit recorder. The fee indicator is reset by the reset signal 138. Now the system is ready for normal validation. If the lane is open then AND gate 139 is open. When the ticket is inserted, AND gate 140 passes a signal which energizes the relay ticket switch 141 which resets the number lock flip-flop 142. This signal will energize the keyboard 143 and cause the add solenoid 144 to accumulate the results.

A detail switch 145 is mounted on the audit recorder. If the switch is closed the audit recorder will print every transaction which occurs at the exit lane. When the switch is opened, although the accumulators will add each transaction to the totals, the recorder will not print every transaction. Even when the detail switch is opened, however, the opening and closing of a lane as well as all alarm and emergency situations will still be printed.

Referring to FIG. 8, the reset output from the number lock flip-flop 142 will energize the print solenoid 146 if detail switch 145 is closed.

When a normal validation is performed the pulse is sent through OR gate 147 to energize the serial number counter solenoid 148 advancing the counter one step before the printing mechanism in the validator is operated. This pulse is also differentiated in order to obtain a more suitable signal with which to operate the statistical counter 149. The purpose of the statistical counter is to count the total number of validations (normal or emergency) as well as to count and classify the partial number of validations performed with each one of the preset keys (hereinafter to be described).

When the car leaves the area the traffic detector provides the set pulse for the number lock flip-flop 142, and the system is now ready for the next operation.

RECEIPT

If a normal validation has been performed, and the car is still present a receipt can be issued by depressing the receipt pushbutton 151. The receipt pushbutton is actually located on the validator 112.

The mechanism involved is the actual printing of both the tickets and the receipt has been already described in my copending application. This mechanism is controlled by an AC solenoid that pushes the printing hammer upward in the validator, imprinting either the ticket or the receipt paper with the time and date, the cashier's identification key number and the keyboard print wheels. The printing is accomplished by the pressure of the hammer on the ribbon which has an advance and reverse mechanism that is operated mechanically with each operation of the printing solenoid.

If the output of the number lock flip-flop indicates a car present, depressing receipt switch 151 will send a signal through OR gate 152 to the print solenoid of the validator. The signal will also operate motor 153 through delay 154. The motor 153 is linked through gear reduction to the roller that advances the receipt paper. The signal to the motor is delayed from the signal which operates the ticket printing so the paper will be printed before the motor operates to advance the paper rollers. This is necessary in order to prevent a smudged print if paper is moving while the imprint is being made.

ALARM CIRCUIT

If a car arrives and leaves without the cashier going through the validation procedure, the alarm circuit will be triggered. When the car arrives, the trigger 134 will be set. However, when the car leaves, the "car not present" signal will be true and since the cashier did not yet validate the ticket there will be a no validation signal which will open AND gate 155. This turns on an AC alarm bell 56 mounted on the same pedestal that holds the fee indicator. The period of time that the bell sounds is controlled by the circuitry.

The alarm signal also energizes the "X print cycle." This cycle energizes the X coil, the black print, and will reset the system for the next operation. This cycle causes a 1 to be printed on the audit tape together with the X. The 1 comes from the car count circuit operated each time a car arrives at the exit booth.

The alarm signal also energizes the subtotal solenoid 132 through OR gate 133 and the time print 128 through OR gate 127.

EMERGENCY VALIDATION

When a car goes through the exit without validation, the alarm circuit previously described will be activated. However, the ticket must still be validated in order to account for all funds received. To accomplish this the emergency switch 158 located on the validator is used.

When the emergency pushbutton is depressed a voltage 159 is set through the line 160. In order to enable the emergency switch the key must be in and the lane must be clear. Therefore, emergency validation cannot be performed if a car is present or if the cashier's key is removed.

When the switch is enabled, the key is in, and the car not present signal is true, AND gate 161 will permit flip-flop 162 to be set. When this is set the emergency light 163, which is mounted on the validator, is turned on, warning the cashier that the system is ready for an emergency operation.

When the ticket is inserted AND gate 164 will send a signal to the keyboard 143 to transmit the information of the validator keyboard to the audit recorder. It will also energize the print solenoid 146 through OR gate 152. Consequently, any number set on the validator keyboard will be printed in black together with a letter E and the amount added to the accumulator, regardless of the position of the detail switch. A signal is also sent to OR gate 147 thereby advancing the serial number counter and providing a pulse for the operation of the statistical counter.

The emergency signal is also fed to OR gate 133 initiating a sequence of a subtotal and a time print, the latter in red.

PRESET KEYS CONTROL

Referring now to FIG. 10, it can be seen that the validator keyboard consists of four banks of keys each of which can be positioned in one of ten slots. The first two places to the left indicate dollar valves. The next two places indicate the coin values. The right most unit digit can be used in either the 0 or 5 position to indicate cents. Thus the four places can show from $00.00 to $99.95 values in multiples of 5 cents.

The remaining places on the unit key are preset for most occurring values. Typically, FIG. 10 shows the remaining positions representing $.50, $.75, $1.00, $1.25, $1.50, $2.00, $2.50, $3.00. These values are arbitrary and can be preset for any particular conditions. In order to make use of the preset keys the remaining keys must be set to zero. The preset keys are operational only when the cashier's key is in, i.e., opening the lane, normal validation and emergency validation.

By merely placing the unit key adjacent to a preset value, that value is automatically recorded both on the fee indicator and on the audit recorder tape.

The preset keys on the validator keyboard are connected to the statistical counter so that the system will record the number of cars which were parked for each preset time period and paid the values of the preset keys.

FIG. 9 shows an audit tape which was taken from the audit recorder and contains all the information of a tour of duty on an individual exit lane.

The tour of duty begins with a B print indicating the beginning of a tour. The number 1050 indicates that the employee beginning the tour bears the key identification number 10 operating in lane 5. (The unit digit must be set to zero to open the lane).

The audit recorder prints the opening and closing data set on the keyboard of the validator of the lanes in red as well as each time print in red.

Immediately after the opening, the totals of the previous tour are printed. This shows how many tickets were validated by the previous employee and how much money was contained in the register when the new employee began his tour. This serves as a check to discourage any employee from taking funds from the cash drawer.

In practice each cashier usually removes his funds when he completes his tour. The purpose of repeating the previous details is to permit the auditor to ascertain that the lane was not in use by any unscrupulous party since the previous cashier completed his tour of duty. It would be possible for another cashier to collect money in a specific lane and be in collaboration with a party having access to the audit record. In this case it would be possible for a complete section of the audit record to be destroyed. Since it would be almost impossible for a cashier to handle the exact same number of vehicles having the exact same revenue as the previous cashier, this feature adds great value to the audit control system. This feature of printing the previous total at the start of a new shift assures continuity of audit and positively eliminates any chance of collusion between cashiers and auditors.

In FIG. 9 the totals show 25 cars exited and $168.10 collected. The accumulator clears itself and then prints no figures, just the letter T to show that the accumulator has been reset to zero. Then the time appears in red following the letter H for hour.

If the detail switch is closed, then each transaction would be printed as is shown in FIG. 9. For each transaction, a 1 is printed indicating one car exiting, followed by the amount of each transaction. The transactions involving the amounts, $1.00, $1.25, $1.50, would be validated by use of the preset keys as hereinbefore explained.

The fifth car to go through departed from the exit lane before validation occurred. This resulted in the printing of 1 indicating one car, followed by X indicating an alarm print. The audit recorder then prints the subtotals of the number of cars exited and the subtotals of the fees collected. In FIG. 9, this was the 5th car and $5.85 had been collected. The time is also printed.

In order to reconcile the system, the ticket must be validated using the emergency button, and then validating the ticket in the usual manner. The auditor records this by printing an E indicating an emergency validation, and then the amount validated. It then prints out a subtotal. The number of cars is still 5, but the total fees are now the previous subtotal plus the emergency validation totaling $6.85. The time is again printed in red.

FIG. 9 shows two additional validations of $1.00 each and another emergency printing of $1.00.

The printing of the emergency validation discourages the employee from forgetting to validate a ticket if a car should just pass through and hand in the fee. This assures that the facility will be used properly by the attendants and discourages any personal pocketing of fees.

At the closing of the lane the recorder prints a C in red followed by the date as set by the cashier on the keyboard. In FIG. 9 the date of closing was 7/10. The recorder then prints the subtotals of the tour of duty. In the example, 8 cars passed through and $9.85 was collected. The time is again printed.

Should the lane be closed and a car should exit regardless, the recorder will print a 1 indicating one car exiting; an X indicating an alarm situation; subtotal the number of cars and fees collected; and print the time.

In the event the detail switch is off, the recorder will not print each and every transaction but only the beginning, closing, an alarm and emergency prints. In normal lane usage, the details of each transaction are not necessary. Thus each printed record will be short, concise, easy to manage and yet providing all information and checking facilities. Should it be necessary to fully check the equipment or a particular employee or lane, the detail switch would then permit recording and printing of each transaction.

PARTICULAR ADVANTAGES OF THE INVENTION

1. A major advantage of the audit tape of this device is that all data pertaining to the operation of the lane is recorded on a single tape in a coordinated fashion which is easily audited. It is unnecessary to correlate two or more separate tapes, as other systems use. Furthermore, since the tape concerns information for one single lane, it is very easy to audit and it minimizes the possibility of error. The tape contains all necessary information such as the cashier operating the lane, the lane number, the number of vehicles passing through during a tour of duty, the total revenue collected by the cashier, and a record of all unusual occurrences.

2. The validator is the only machine which, by inserting the ticket in only one slot, will permit recording thereon the date and time, amount of transaction, cashier handling the transaction and validation serial number.

3. All other systems require a separate time and date stamp after which the ticket is certified in the printing position of the cash register. This takes a considerably longer time, slowing up the operation of the cashier, and therefore fewer cars per hour can be handled by any single cashier.

4. The serial number is indexed only as a car enters a lane. Therefore, the serial number printed on a receipt will correspond to the same identical number printed on the previous parking check validator. Hence, if a patron questions the amount charged, the serial number on the receipt will permit management to retrieve the very parking check surrendered by the patron. A further feature is the fact that the closing serial number of one cashier must check with the opening serial number of the preceding cashier in the lane, further assuring that there was no unscrupulous use of the lane and the audit tape for that unscrupulous period destroyed.

The term "barrier" is intended to include physical barrier such as gates as well as signal lights and the like.

There has been disclosed heretofore the best embodiment of the invention presently contemplated and it is to be understood that various changes and modifications may be made by those skilled in the art without departing from the spirit of the invention.

What I claim as new and desire to secure by Letters Patent is:

I claim:

1. In a vehicular parking facility having an exit lane and vehicle detector means proximate to said exit lane, the system comprising, a manually operated ticket validating device having a keyboard for setting monetary value data, display means controlled by said validating device for indicating the monetary values set on said keyboard, and an audit recorder associated with only said exit lane, controlled by said keyboard and said vehicle detector, said audit recorder having:
   a. accumulator means for adding the monetary values set on said keyboard to previously accumulated values;
   b. counting means for retaining a record of the number of outputs of said vehicle detector means;
   c. clock means for keeping a record of real time of the transactions; and
   d. imprinting means for printing the monetary values set on said keyboard, said accumulator totals, said counting record and said real time; wherein said audit recorder provides a complete printed audit record of each exit lane for each tour of duty.

2. A system as in claim 1 wherein said keyboard contains a plurality of individual columns of keys each having a plurality of slots whereby each slot represents a decimal value of said monetary value data.

3. A system as in claim 2 wherein one of said plurality of columns of keys has each of its slots representing preset monetary values whereby a single setting of this one key represents an entire value.

4. A system as in claim 1, wherein said audit recorder further includes error signal printing means wherein a record is printed of each transaction not following a prescribed validating procedure.

5. A system as in claim 1 including an identifying key provided with a number printing means for printing an assigned key number on a ticket whereby when the assigned key number is set on the keyboard, a printout of the set number is obtained on a remote tape and on a ticket imprinted with the identifying key number.

6. The system as in claim 1 wherein said complete audit record includes a single tape, operator and location data, opening and closing time, monetary amount total, alarm and emergency procedure data.

7. The system as in claim 1 including means for printing a transaction serial number on a ticket and means for printing the same number on a receipt involved in the same transaction.

8. The system as in claim 7 including means for additionally printing a monetary amount and the real time on said ticket.

9. Apparatus for control of revenue for a vehicular parking facility having a vehicle exit lane comprising in combination:
   vehicle presence sensing means located proximate said exit lane and defining an exit lane vehicle presence detection zone wherein said means are responsive to the presence of a vehicle in said zone, and
   a manually-operated ticket validating device located proximate the said zone, said validating device having:
   a. imprinting means for imprinting transaction time data;
   b. imprinting means for imprinting monetary value data on a ticket inserted in said validating device wherein said monetary value imprinting means is normally locked in a nonprinting condition; and
   c. an actuating means under control of said sensing means for unlocking said imprinting means thereby permitting operation of said imprinting means only when a vehicle is in said zone.

10. The apparatus of claim 9 including means for locking the validating device imprinting means upon the imprinting of a ticket and reset means under the control of said sensing means for unlocking said imprinting device upon the departure of a vehicle from said zone.

11. The apparatus of claim 9 including alarm means under the common control of said sensing means and said validating means whereby an alarm is sounded if a vehicle traverses said zone without a ticket being validated during said passage.

12. The apparatus of claim 9 including manually operated energizing means for said imprinting means for printing of receipts on demand, said energizing means being under control of said vehicle sensing means whereby said imprinting energizing means can be energized only when a vehicle is in the presence of said vehicle sensing means.

13. The apparatus of claim 9 wherein said sensing means are sensitive to vehicle direction and are arranged to provide an error signal whenever a vehicle enters said presence detection zone in other than a predetermined direction.

14. The system of claim 9 including indicating means controlled by said validating device displaying the monetary value imprinted on the validated ticket.

15. The apparatus of claim 9 wherein said validating device is provided with a key controlled disabling device wherein, in the absence of a properly inserted key, said imprinting means is disabled.

16. The apparatus of claim 9 including a key provided with raised indicia and means provided within said validating device for receiving said key whereby said key places said imprinting means in an operative condition and said raised indicia is positioned in operative relationship with said imprinting means whereby tickets being imprinted have imprinted indicia corresponding to said raised indicia.

17. Apparatus for control of revenue for a vehicular parking facility having a vehicle exit lane comprising in combination:
   vehicle presence sensing means located proximate said exit lane and defining an exit lane vehicle presence detection zone wherein said means are responsive to the presence of a vehicle in said zone;
   a ticket validating device having imprinting means, said device being located proximate said zone arranged to imprint transaction time data and a monetary value on a ticket only when a vehicle is in said vehicle presence detection zone;
   value setting means for setting the monetary value to be imprinted;
   locking means arranged to be actuated upon the imprinting of a ticket for locking said value setting means against change; and
   release means under control of said sensing means for disengaging said locking means upon the departure of a vehicle from said zone.

18. Apparatus for control of revenue for a vehicular parking facility having a vehicle exit lane comprising in combination:
   vehicle presence sensing means located proximate said exit lane and defining an exit lane vehicle presence detection zone wherein said means are responsive to the presence of a vehicle in said zone;
   a ticket validating device having imprinting means, said device being located proximate said zone arranged to imprint transaction time data and a monetary value on a ticket only when a vehicle is in said vehicle presence detection zone; and
   event-accumulating means for registering the total number of vehicles passing the said zone and printing means associated therewith for printing said total and time data, said printing means being under the common control of said sensing means and said validating means whereby an imprint is made by said printing means of said total and time a vehicle traverses said zone without a ticket being validated during said passage.

19. Apparatus for control of revenue for a vehicular parking facility having a vehicle exit lane comprising in combination:
   vehicle presence sensing means located proximate said exit lane and defining an exit lane vehicle presence detection zone wherein said means are responsive to the presence of a vehicle in said zone;
   a ticket validating device having imprinting means, said device being located proximate said zone arranged to imprint transaction time data and a monetary value on a ticket only when a vehicle is in said vehicle presence detection zone;
   a key provided with raised indicia and means provided within said validating device for receiving said key whereby said key places said imprinting means in an operative condition and said raised indicia is positioned in operative relationship with said imprinting means whereby tickets being imprinted have imprinted indicia corresponding to said raised indicia; and
   circuit means automatically actuated upon insertion of the said key for causing a remote recording to be made of the accumulated validated ticket count.

20. A system for control of revenue for a vehicular parking facility having at least one vehicle exit lane comprising in combination:
   vehicle presence sensing means located proximate said exit lane and defining an exit lane vehicle presence detection zone wherein said means are responsive to the presence of a vehicle in said zone and to the passage of a vehicle through said zone in other than a prescribed direction;
   a ticket validating device proximate said exit lane vehicle presence detection zone arranged to imprint a monetary value on a ticket on demand only when a vehicle is in said vehicle presence detection zone;
   error signal generating means connected to said exit lane vehicle presence sensing means to produce an error signal whenever a vehicle passes through said zone in other than a prescribed direction; and
   recorder means responsive to a said error signal for making a record of the event.

21. A system for control of revenue for a vehicular parking facility having a vehicle exit lane comprising in combination:
   vehicle presence sensing means located proximate said exit lane and defining an exit lane vehicle presence detection zone wherein said means are responsive to the presence of a vehicle in said zone and the direction of passage of a vehicle through said zone;
   a ticket validating device proximate said exit lane vehicle presence detection zone arranged to imprint a monetary value on a ticket on demand only when a vehicle is in said vehicle presence detection zone;

indicating means controlled by said validating device for displaying the monetary value imprinted on the validated ticket;

error signal generating means connected to said exit lane vehicle presence sensing means to produce an error signal whenever a vehicle passes through said zone in other than a predetermined direction; and recorder means responsive to a said error signal for making a record of the event.

22. A system for control of revenue for a vehicular parking facility having a vehicle exit lane comprising in combination:

vehicle presence sensing means located proximate said exit lane and defining an exit lane vehicle presence detection zone wherein said means are responsive to the presence of a vehicle in said zone;

a ticket validating device proximate said exit lane vehicle presence detection zone arranged to imprint a monetary value on a ticket on demand only when a vehicle is in said vehicle presence detection zone;

a manually operable bypass circuit for causing said validating device to validate a ticket, inserted in said validating device, in the absence of a vehicle in said detection zone;

means controlled by said bypass circuit for generating an error signal; and recorder means responsive to a said error signal for making a record of the event.

23. A system for control of revenue for a vehicular parking facility having a vehicle exit lane comprising in combination:

vehicle presence sensing means located proximate said exit lane and defining an exit lane vehicle presence detection zone wherein said means are responsive to the presence of a vehicle in said zone;

a ticket validating device proximate said exit lane vehicle presence detection zone arranged to imprint transaction time data and a monetary value on a ticket upon demand only when a vehicle is in said vehicle presence detection zone;

indicating means controlled by said validating device for displaying the monetary value of the validated ticket for at least the time the vehicle is in the said detection zone;

error signal generating means connected to said exit lane vehicle presence sensing means to produce an error signal whenever a vehicle passes through said exit lane without a ticket being imprinted by said validating device; and recorder means responsive to an error signal from said error signal generating means for making a record of the event.

24. A system for control of revenue for a vehicular parking facility having a vehicle exit lane comprising in combination:

vehicle presence sensing means located proximate said exit lane and defining an exit lane vehicle presence detection zone wherein said means are responsive to the presence of a vehicle in said zone and the direction of movement of a vehicle through said zone;

a ticket validating device proximate said exit lane vehicle presence detection zone arranged to imprint a monetary value on a ticket only when a vehicle is in said vehicle presence detection zone;

indicating means controlled by said validating device for displaying the monetary value of the validated ticket;

error signal generating means connected to said exit lane vehicle presence sensing means to produce an error signal whenever said sensing means detects a vehicle moving through said zone in other than a predetermined direction;

recorder means responsive to an error signal from said error signal generating means for making a record of the event; and alarm means connected to said error signal generating means and responsive to error signals therefrom.